United States Patent [19]

Nagata et al.

[11] 4,082,727

[45] Apr. 4, 1978

[54] METHOD FOR MANUFACTURE OF NON-COAGULATIVE ORGANOSILICONE POLYMER

[75] Inventors: Akira Nagata, Kawanishi; Jun Iyoda, Ikeda, both of Japan

[73] Assignee: Agency of Industrial Science & Technology, Tokyo, Japan

[21] Appl. No.: 734,011

[22] Filed: Oct. 19, 1976

[30] Foreign Application Priority Data

Oct. 21, 1975  Japan .................................. 50-127004

[51] Int. Cl.² .............................................. C08G 77/04
[52] U.S. Cl. ......................... 260/46.5 G; 260/46.5 E;
260/46.5 G; 536/21; 128/DIG. 21
[58] Field of Search ..................... 536/21; 260/46.5 R,
260/46.5 G, 46.5 E

[56] References Cited

FOREIGN PATENT DOCUMENTS 1,344,156  10/1963  France .................................. 536/21

*Primary Examiner*—Melvyn I. Marquis
*Attorney, Agent, or Firm*—Oblon, Fisher, Spivak, McClelland & Maier

[57] ABSTRACT

A non-coagulative organosilicone resin is produced by causing an organosilicon compound containing an isocyanate group and possessing a siloxane-forming property to react with heparin in order to produce an organosilicon compound having a heparin residue linked thereto and subsequently causing the resultant organosilicon compound to react with an organosilicone resin intermediate capable of undergoing a polycondensation reaction via silanol intermediates and consequently forming a siloxane cross-link.

8 Claims, No Drawings

METHOD FOR MANUFACTURE OF NON-COAGULATIVE ORGANOSILICONE POLYMER

BACKGROUND OF THE INVENTION

This invention relates to a method for the manufacture of a non-coagulative organosilicone resin which retains heparin by virtue of a covalent bond.

Artificial internal organs, extracorporeal circulation devices and other medical accessories such as catheters, blood preservers and injectors are today medical necessities and among these are many made of various synthetic resins such as silicone rubber, polyvinyl chloride, Teflon, polyethylene, polyurethane, polycarbonate, polyethylene terephthalate, polyvinyl alcohols, etc. Being foreign matter, these resins often cause undesirable reactions in living organisms such as, for example, coagulation of blood.

Organosilicone resins exhibit less adverse effects on living tissues and induce less blood coagulation than the resins enumerated above and, therefore, are extensively used as raw materials for medical utensile. Nevertheless, the non-coagulative property of these resins is by no means perfect. For this reason, it is an important task to improve the non-coagulative property of organosilicone resins.

As a means for enhancing the non-coagulative property of the resins, there has heretofore been suggested a method directed to incorporating into the resin an anticoagulating agent represented by heparin. This method is referred to as "heparinization." Heparinization is applicable to organosilicone resins and is believed to be effective in improving these resins in terms of non-coagulative property. If the heparin thus incorporated into the resin is retained therein by virtue of ionic bonds, however, the effect brought about by the presence of heparin will gradually diminish because the heparin in that state readily exudes from the resin. It follows as a consequence that the anticoagulating activity exhibited by this agent cannot be retained for a long time.

The primary object of the present invention is to provide a method for the manufacture of a non-coagulative organosilicone resin which retains the anticoagulant, heparin, fast and stably for a long time.

SUMMARY OF THE INVENTION

To attain the object described above, this invention obtains the non-coagulative organosilicone polymer by causing (1) an organosilicon compound possessed of an isocyanate group, represented by the following formula:

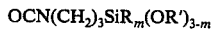

(wherein, R denotes an alkyl or aryl group, R' an alkyl, aryl, alkoxyalkyl or acyl group and $m$ an integer having the value of 0, 1 or 2) and (2) a heparin compound which is a salt formed between heparin and a quaternary ammonium compound such as cetylpyridinium chloride, cetyldimethyl benzylammonium chloride, tridodecylmethylammonium chloride or tricaprylmethylammonium chloride and which is soluble in an organic solvent such as pyridine, tetrahydrofuran, dichloromethane or toluene or in a mixture of such organic solvents to react with one another in an organic solvent at temperatures in the range of from 20° to 80° C for 0.5 to 24 hours to produce an organosilicon compound having a siloxane-forming capacity and containing a heparin residue linkage, and subsequently subjecting the heparin residue-linked organosilicon compound to copolycondensation with room temperature vulcanizable condensation (herein after referred to "RTV") type organosilicone resin intermediate such as silicone rubber.

DETAILED DESCRIPTION OF THE INVENTION

The inventors pursued research for the purpose of developing an organosilicone polymer having heparin retained therein fast and stably and, consequently, accomplished the present invention. To be specific, this invention has issued from the discovery that a non-coagulative organosilicone polymer which has heparin retained by virtue of a covalent bond in the side chain thereof is obtained by causing an organosilicon compound containing an isocyanate group as a substituent to react with heparin in order to produce an organosilicon compound having a heparin residue linkage and thereafter causing said resultant organosilicon compound to react with an organosilicone resin intermediate capable also of readily forming a silanol group in the presence of water.

Now, the individual steps which make up the method of this invention will be described in detail.

The organosilicon compound used for the purpose of this invention and containing an isocyanate group as the substituent is a member of the class of compounds represented by the formula:

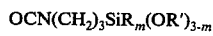

(wherein, R denotes an alkyl or aryl group, R' an alkyl, aryl, alkoxyalkyl or acyl group and $m$ an integer having the value of 0, 1 or 2).

Of the compounds of said class, preferable are those which satisfy the foregoing formula where R is a methyl, ethyl, or phenyl group, R' a methyl, ethyl, propyl, butyl, phenyl, ethoxyethyl or acetyl group and $m$ an integer having the value of 0 or 1.

Specific examples of said preferred organosilicon compounds containing an isocyanate group as the substituent are γ-trimethoxysilylpropyl isocyanate, γ-methyldimethoxysilylpropyl isocyanate and γ-triethoxysilylpropyl isocyanate.

This organosilicon compound containing an isocyanate group as the substituent is caused to react with heparin.

Since an organic isocyanate tends to produce a urea derivative and SiOR' groups would also hydrolyze in the presence of water, any reaction involving the organic isocyanate is required to be carried out in a non-aqueous solvent. In the present invention, the reaction between the organosilicon compound containing an isocyanate as the substituent and the heparin is carried out in a non-protonic organic solvent. Incidentally, heparin is usually marketed in the form of a sodium salt. Since the sodium salt of heparin is not soluble in organic solvents, it must be converted into a form soluble in organic solvents in advance of said reaction. Fortunately, heparin readily forms salts with various quaternary ammonium compounds. For the reaction of this invention, therefore, it suffices to have heparin converted into a quaternary ammonium compound which is soluble in organic solvents.

Examples of the quaternary ammonium compound which meets this requirement include tridodecylmethylammonium chloride, tricaprylmethylammonium chloride, cetyldimethylbenzylammonium chloride, cetylpyridinium chloride and benzalkonium chloride.

When such a heparin compound soluble in organic solvents is allowed to react with said organosilicon compound containing an isocyanate group in a non-protonic organic solvent, a urethane linkage occurs preponderantly between a hydroxyl group of heparin and the isocyanate group of the organosilicon compound and the heparin residue is incorporated into the organosilicon compound. As the organic solvent for use in this reaction, pyridine is found to be preferable in terms of boiling point, reactivity, etc. Other non-protonic solvents which may be used are tetrahydrofuran, dichloromethane, toluene and mixtures thereof. If there is used a solvent other than pyridine, it is advantageous for the purpose of the reaction to add pyridine, triethylamine or some other tertiary amine as the catalyst to this solvent.

The reaction resulting in the formation of said urethane linkage is desired to be carried out under the conditions of 20° to 80° C, preferably 40° to 60° C, of temperature and 0.5 to 24 hours, preferably 0.5 to 3 hours, of reaction time. If the reaction is carried out below the lower limits, then it fails to proceed sufficiently. If the upper limits are exceeded, then the reaction entails denaturation and inactivation of heparin and consequently brings about degradation of the effect of heparin.

The silicon content of the reaction product between heparin and the isocyanate compound occurring in this reaction can be varied as desired by properly selecting the amounts of the two substances charged prior to the reaction, the molar ratio thereof, the reaction temperature and the reaction time. If the silicon content of said reaction product is extremely small, then the effect of crosslinking heparin to the silicone backbone becomes insufficient. If the silicon content is increased conspicuously, then the anticoagulating effect of heparin is not attained. The silicon content in the reaction product amined at is, therefore, desired to fall in the range of from ½ to 1/30, in molar ratio, based on the hexose ring.

After the reaction is terminated, the whole reaction mixture is poured into a large volume of a precipitant such as ether which is incapable of serving as the solvent for the reaction product, so as to permit the reaction product to separate off in the form of precipitate. The precipitate is further subjected to a refining treatment such as extraction or reprecipitation so as to be freed from unreacted isocyanate compound and low molecular weight by-products. Finally, it is vacuum dried to give rise to a highly pure organosilicon compound having the heparin residue linked thereto.

In the next step, the organosilicon compound thus having the heparin residue linked thereto is caused to react with an organosilicone resin intermediate. Since this organosilicon compound containing a heparin residue linkage has an ability to form a siloxane linkage, it will readily react with the organosilicone resin intermediate.

For effective use in this invention, this organosilicone resin intermediate has only to fulfill the requirement that it be of a type capable of forming a siloxane chain via condensation of silanol intermediates. It may be selected with much freedom, therefore, so as to meet the purpose for which the finally obtained shaped article will be used. This organosilicone resin intermediate comprises either or both of (1) a polyfunctional organosilicon compound and (2) a polysiloxane possessed of a functional group at the terminal. The intermediate has a substituent such as hydroxy, alkoxy, aryloxy, alkenyloxy, acyloxy, amino or alkyl-substituted iminoxy group linked directly to the silicon atom in the case of (1) above or to the silicon atom at the terminal of said siloxane chain in the case of (2) above. These substituents, which are also present in the heparin residue-containing organosilicon compound and are represented by the group OR', are readily hydrolyzable to silanol groups in the presence of water. Silanol groups undergo mutual dehydrating condensation and consequently form a siloxane linkage. The moisture in the air and the very small amount of water in the solvent can also serve as the water which is capable of causing said hydrolysis of the substituent.

Concrete examples of organosilicone resin intermediates with such properties are what is referred to as room temperature vulcanizable or RTV silicone rubber as well as silicone varnish. RTV silicone rubber is available in two types: a one-component type and a two-component type.

Now, the reaction to be effected between the organosilicon compound having the heparin residue linked thereto and the organosilicone resin intermediate will be described: This reaction can easily be carried out by allowing the former compound to exist in the reaction system in which the resin intermediate is cured by condensation.

This reaction will now be described by taking, for example, the case in which the RTV silicone rubber typifying the organosilicon resin intermediate is used. The RTV silicone rubber and the organosilicon compound possessed of the heparin residue are dissolved and mixed in their mutual solvent such as, for example, dichloromethane. Although the choice of solvent is not critical, it is nevertheless desirable that the solvent be selected by duly considering the structures of the quaternary ammonium moiety of the organosilicon compound possessed of the heparin residue and the RTV silicone rubber. The solvent should also be easily removable from the finally produced shaped article by such means of extraction as vacuum drying or use of a harmless solvent like physiological saline, for example, so that the finally produced shaped article destined to be put to special uses will not retain the solvent. Examples of solvents which are acceptable for use in this treatment include hydrocarbons, halogenated hydrocarbons, ketones, ethers, esters and tertiary amines.

The reaction of the RTV silicone rubber with the organosilicon compound containing the heparin residue can otherwise be carried out by merely mixing the two substances intimately in the absence of a solvent with the aid of some suitable mechanical means and subsequently shaping the resultant mixture to the desired form. In this case, there is a fair possibility that the organosilicon compound containing the heparin linkage will not be thoroughly dispersed in the shaped article. It is, therefore, necessary, that the mixing of said two substances be performed to a thorough extent.

In the reaction described above, the organosilicon compound containing the heparin residue is used in the range of from 1 to 20 parts by weight based on 100 parts by weight of the organosilicon resin intermediate. In the shaped article obtained as the result of said reaction, heparin calculated as the sodium salt is contained at a proportion of 4 to 80 mg per g of the shaped article.

In the former reaction effected in the presence of a solvent, a product having a high heparin content can be obtained by suitably selecting the amount and kind of solvent.

The heparin-containing organosilicone resin manufactured by the method of this invention exhibits a non-coagulative property notably improved over that which is shown by a corresponding silicone resin destitute of the heparin residue.

For example, the heparin-containing organosilicone resin obtained by the method of this invention is not observed to be degraded in its non-coagulative property even after it has been extracted with a solvent such as ethyl alcohol or pyridine or with an electrolytic aqueous solution such as a saturated common salt solution.

The intimate mixture of the heparin residue-containing organosilicon compound with the RTV silicone rubber which is obtained in the intermediary step of the process involved in this invention can be preserved intact when protected from humidity. Through a suitable treatment, this mixture may freely be cured immediately before use so as to be shaped to a desired form.

The RTV silicone rubber has been cited as a typical example of the organosilicon resin intermediate for use in the method of this invention. This RTV silicone rubber has an advantage that it exhibits high adhesive property to metals, glass and various plastics and, when used in conjunction with a primer, enjoys improved adhesive property and therefore permits easy surface coating or lining on other materials. This advantageous property is substantially retained unaffected even after the heparin molecule has been incorporated as effected by the method of this invention.

Owing to this advantageous property, the anticoagulant organosilicone resin obtained by the method of this invention can be used for coating the surface of various medical devices and thereby imparting desired non-coagulative property to said devices. If the shaped article using the organosilicone resin manufactured by the method of this invention is found to be deficient in strength, then the difficulty may be overcome by making the shaped article with a material of sufficient strength and subsequently coating the shaped article with the organosilicone resin obtained by this invention.

The present invention will be described hereinbelow in further detail with reference to preferred embodiments.

EXAMPLE 1

Into a 10% aqueous solution of 1.8 g of sodium salt of heparin (164 units/mg) available on the market, a 5% aqueous solution of 3.7 g of cetylpyridinium chloride was added under continued agitation. The white precipitate which consequently occurred in the combined solution was isolated and purified by centrifugation and washing with water. The purified precipitate was subjected to freeze-drying and then left to dry over phosphorus pentoxide under vacuum for two days, yielding 4.5 g of the cetylpyridinium salt of heparin. In 12 ml of dry pyridine, 800 mg of said cetylpyridinium salt of heparin was dissolved. Then the solution was agitated with 700 mg of γ-triethoxysilylpropyl isocyanate (corresponding to a proportion of 3 molecules of said isocyanate per hexose ring of the heparin backbone) and the resultant mixture was left to stand at rest at room temperature for 20 hours and then heated at 40° C for four hours. The resultant reaction solution was slowly poured into 50 ml of ether to cause crystallization of an organosilicon compound having a heparin residue linked thereto. When this precipitate was washed repeatedly with ether and then subjected to vacuum drying, there was obtained 830 mg of a white powder. When a pyridine solution of this heparin residue-containing organosilicon compound was examined by $^1$HNMR (nuclear magnetic resonance absorption), a quartet corresponding to the methylene group of Si-OCH$_2$CH$_3$ was detected at $\delta_{3.79}$ ppm. Calculation based on the comparison of intensity with the signal at $\delta_{1.28}$ ppm of the methylene group originating in the cetyl group in the cetylpyridinium salt of heparin shows that about 0.5 —Si(OCH$_2$CH$_2$)$_3$ had been incorporated per hexose ring of the heparin backbone.

Then, to 100 parts by weight of a one-component type RTV silicone rubber, KE-42-RTV, made by Shinetsu Chemical Industry Co., Ltd., 5 parts by weight of said heparin residue-containing organosilicon compound was added in the form of a 2% dichloromethane solution. In a tightly stoppered container, the two substances were stirred to perfect homogeneity. The resultant homogeneous mixture was applied to a glass watch crystal and then left to stand at rest in the air for 24 hours to be copolycondensed and consequently cured and shaped. What resulted from the curing was a non-coagulative organosilicone polymer. This polymer was treated under vacuum for 8 hours, then subjected to immersion extraction with ethanol for 3 days and then with physiological saline for 7 days and finally tested for non-coagulative property.

The test for non-coagulative property was performed as follows: In said watch crystal which was held at 37° C, 0.25 ml of fresh ACD blood from a dog was placed and 0.025 ml of an aqueous solution of 0.1M calcium chloride was added thereto to initiate coagulation of said blood. After elapse of a prescribed time, the contents of the watch crystal was diluted with water to stop the coagulation. The mass of coagulated blood formed at this point was washed with water, set with added formalin, washed again with water and then freed from water. The remaining mass of coagulated blood was weighed. Under entirely the same conditions as described above, a similar mass of coagulated blood was obtained on an unsmeared watch crystal and weighed. The ratio of the weight of the mass of coagulated blood caused by the cured specimen obtained by the method of this invention to that of the mass of coagulated blood obtained on the clean watch crystal was calculated. The results are shown in Table I hereinbelow.

EXAMPLE 2

In 5 ml of dry pyridine, 300 mg of the cetylpyridinium salt of heparin obtained in Example 1 was dissolved. The resultant solution was agitated with 0.3 ml of γ-trimethoxysilylpropyl isocyanate to obtain a mixture (I). Two additional mixtures (II) and (III) identical to the mixture (I) were also prepared. These mixtures were allowed to react at 40° C for 30 minutes (I), 60 minutes (II) and 120 minutes (III), then reprecipitated and extracted with ether and finally subjected to vacuum drying, each to afford about 310 mg of a heparin residue-containing organosilicon compound in the form of white powder. The products were prepared each in the form of pyridine solution and tested by $^1$HNMR. In each case, a singlet peak corresponding to SiOCH$_3$ was detected at $\delta_{3.56}$ ppm. Calculation based on the intensity of the peak shows that approximately 1/30 (I), 1/25 (II) and 1/20 (III) of Si(OCH$_3$)$_3$ had been incorporated per hexose ring in the heparin.

Then, to 100 parts by weight of a one-component RTV silicone rubber, KE-42-RTV, made by Shinetsu Chemical Industry Co., Ltd., 5 parts by weight of said heparin residue-containing organosilicon compound (II) was added in the form of a 2% dichloromethane solution. In a tightly stoppered container, the two substances were mixed to perfect homogeneity. The resultant homogeneous mixture was applied to a watch crystal and then left to stand in the air for 24 hours to undergo curing. Thereafter, the mixture in the watch crystal was treated under vacuum at room temperature for eight hours. It was divided into three aliquots a, b and c. The aliquots were subjected to an extraction treatment as described above to be freed from free ammonium salt of heparin.

(a) This aliquot was kept immersed in pyridine for 3 days and in physiological saline for 4 days at room temperature.
(b) This aliquot was kept immersed in a saturated common salt solution for 3 days at 50° C and in physiological saline for 4 days at room temperature.
(c) This aliquot was kept immersed in physiological saline for 7 days at room temperature.

All the extracts involved in these treatments were replaced with fresh supply at intervals of 1 day. After the immersion treatment, the aliquots were subjected to tests for non-coagulative property by following the procedure described in Example 1. The results are given in Table 1.

EXAMPLE 3

To a 5% aqueous solution of 0.5 g of sodium salt of heparin (164 units/mg) available in the market, a 5% aqueous solution of 1.0 g of cetyldimethylbenzylammonium chloride was added under continued agitation. The white precipitate which consequently occurred was purified and dried by a procedure similar to that of Example 1 to afford 1.3 g of the cetyldimethylbenzylammonium salt of heparin.

In 6 ml of dry pyridine, 300 mg of said cetyldimethylbenzylammonium salt of heparin was dissolved. The solution and 0.8 ml of γ-trimethoxysilylpropyl isocyanate added thereto were allowed to react with each other at 40° C for 5 hours.

The reaction solution was poured into 60 ml of dry ether, then shaken and left to stand overnight in a tightly stoppered container at room temperature to cause precipitation of a heparin residue-containing organosilicon compound. When this precipitate was washed with ether and subjected to vacuum drying, there was obtained 320 mg of a white powder. By $^1$HNMR, this heparin residue-containing organosilicon compound was shown to possess a SiOCH$_3$ group.

Then, to 100 parts by weight of a one-component type RTV silicone rubber, KE-42-RTV, made by Shinetsu Chemical Industry Co., Ltd., 10 parts by weight of said heparin residue-containing organosilicon compound was added in the form of a 2% tetrahydrofuran solution. Thereafter, the resultant mixture was cured and shaped by following the same procedure as described in Example 2. The specimen thus produced was extracted with ethanol for 24 hours and subsequently with physiological saline for three days and thereafter tested for non-coagulative property by the same procedure as that of Example 1.

The results are shown in Table 1.

COMPARISON EXAMPLE

The one-component RTV silicone rubber, KE-42-RTV, made by Shinetsu Chemical Industry Co., Ltd. alone was diluted and applied to the watch glass, left to cure and subjected to extraction by the same procedure as that of Example 1. The specimen consequently obtained was tested for non-coagulative property. The results are shown in Table 1.

Table 1

| Test specimen (ratio) | Time (in minutes) | | |
|---|---|---|---|
| | 10 | 15 | 30 |
| Glass (reference standard) | 100 | 100 | 100 |
| One-component type RTV silicone rubber, KE-42-RTV, made by Shinetsu Chemical Industry (Comparison) | 70 | | |
| Non-coagulative organosilicone polymer of Example 1 | 30 | | |
| " Example 2 (a) | 5 | | |
| " Example 2 (b) | under 1 | 1 | 10 |
| " Example 2 (c) | 2 | 1 | 10 |
| " Example 3 | 4 | 30 | |
| " Example 4 | under 1 | | |
| " Example 5 | under 1 | | |

EXAMPLE 4

To 100 parts by weight of a one-component RTV silicone rubber, KE-45-RTV, made by Shinetsu Chemical Industry Co., Ltd., 10 parts by weight of the heparin residue-containing organosilicon compound (III) of Example 2 was added in the form of a 3% dichloromethane solution. In a tightly stoppered container, the two substances were mixed to perfect homogeneity. The resultant homogeneous mixture was applied to a watch crystal and then left to stand in the air for 24 hours to undergo curing. Thereafter, the mixture in the watch crystal was treated under vacuum at room temperature for 8 hours, and then the resultant mixture was immersed in physiological saline at room temperature for 4 days. After the immersion treatment, the mixture was subjected to test for non-coagulative property by following the procedure described in Example 1. The results are given in Table 1.

EXAMPLE 5

To 100 parts by weight of a one-component RTV silicone rubber, KE-48-RTV, made by Shinetsu Chemical Industry Co., Ltd., 5 parts by weight of the heparin residue-containing organosilicon compound (III) of Example 2 was added in the form of a 3% dichloromethane solution. In a tightly stoppered container, the two substances were mixed to perfect homogeneity. The resultant homogeneous mixture was applied to a watch crystal and then left to stand in the air for 24 hours to undergo curing. Thereafter, the mixture in the watch crystal was treated under vacuum at normal temperature for 8 hours. The resultant mixture was immersed in ethanol at room temperature for 1 day and in physiological saline at room temperature for 6 days. After the immersion treatment, the mixture was subjected to test for non-coagulative property by following the procedure described in Example 1. The results are given in Table 1.

The KE-42-RTV, KE-45-RTV, and KE-48-RTV silicone rubbers, made by Shinetsu Chemical Industry Co., Ltd., and used in the foregoing examples are characterized as follows:

KE-42-RTV—one-component deacetification type.
KE-45-RTV—one-component de-oxime type.
KE-48-RTV—one-component de-alcohol type.

What is claimed is:

1. A method for the manufacture of a non-coagulative organosilicone polymer, which comprises reacting an isocyanate group-containing organosilicon compound of the formula, $OCN(CH_2)_3SiR_m(OR')_{3-m}$, wherein R denotes an alkyl or aryl group, R' denotes a group selected from the class consisting of alkyl, aryl, alkoxyalkyl, and acyl groups, and m is the integer having the value of 0, 1 or 2, with a heparin compound soluble in organic solvents, to which are dissolved in a non-protonic organic solvent and held therein at a temperature in the range of from 20° to 80° C for a period of from 0.5 to 24 hours thereby affording a reaction product containing therein an organosilicon compound containing a heparin residue wherein there is 1/30 to ½ silicon atom per hexose ring of the heparin backbone; subsequently separating said heparin residue-containing organosilicon compound from said reaction product and purifying the separated compound; and causing the purified heparin residue-containing organosilicon compound to react, in the presence of water, with an organosilicone resin intermediate which is also capable of readily undergoing hydrolysis in the presence of water and consequently forming a siloxane linkage via copolycondensation of silanol intermediates.

2. The method of claim 1, wherein said substituent R in the formula is one member selected from the class consisting of methyl, ethyl and phenyl groups and the substituent R' is at least one member selected from the class consisting of methyl, ethyl, propyl, butyl, phenyl, ethoxyethyl and acetyl groups.

3. The method of claim 1, wherein said heparin compound is a heparin salt formed from at least one member selected from the group consisting of tridodecylmethylammonium chloride, tricaprylmethylammonium chloride, cetyldimethylbenzylammonium chloride, cetylpyridinium chloride and benzalkonium chloride and where said compound is soluble in organic solvents.

4. The method of claim 1, wherein said non-protonic organic solvent is one member selected from the group consisting of pyridine, tetrahydrofuran, dichloromethane and toluene.

5. The method of claim 1, wherein said organosilicone resin intermediate contains at least one terminal group selected from the class consisting of polyfunctional organosilicon terminals and polysiloxane chain terminals, where said terminals contain at least one substituent selected from the class consisting of hydroxy, alkoxy, aryloxy, alkenyloxy, acyloxy, amino and alkyl-substituted iminoxy groups, said substituent being directly linked with the silicon atoms at said terminals.

6. The method of claim 5, wherein said organosilicone resin intermediate is a room temperature vulcanizable silicone rubber capable of undergoing condensation reactions.

7. The method of claim 5, wherein said organosilicone resin intermediate is a silicone varnish.

8. The method of claim 6, wherein said RTV silicone rubber is at least one member selected from the group consisting of one-component type and two-component type silicone rubber products.

* * * * *